April 5, 1955　　　T. G. STEWART　　　2,705,568
TOWEL BARS
Filed Aug. 14, 1951　　　　　　　　　2 Sheets-Sheet 1
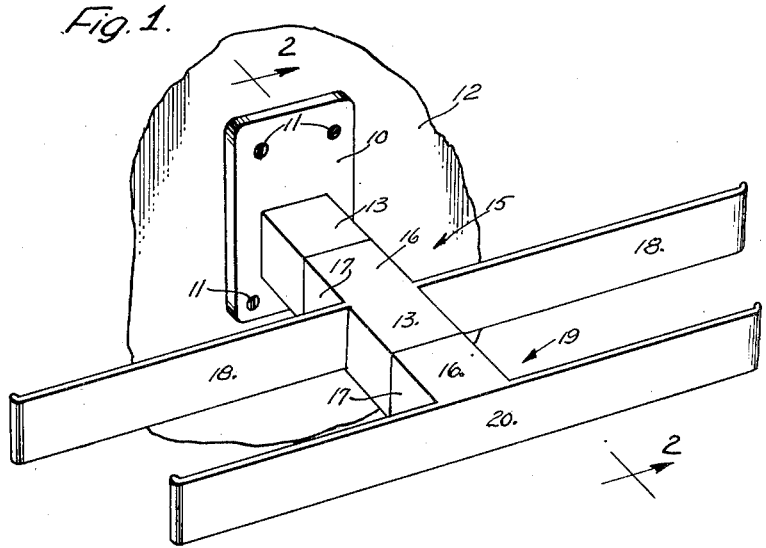
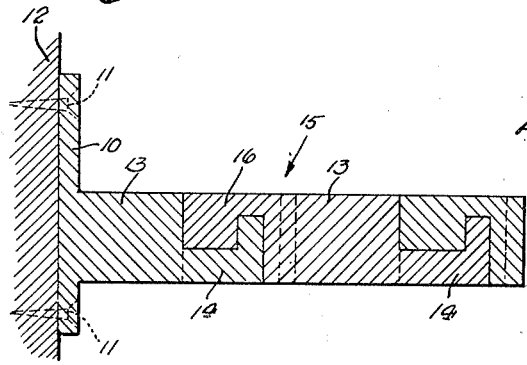
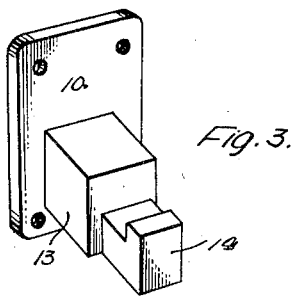
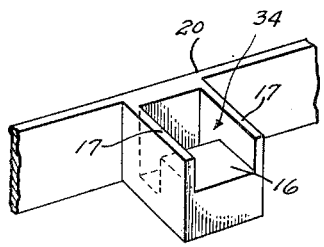
INVENTOR
Thelma G. Stewart

INVENTOR

Thelma G. Stewart

United States Patent Office 2,705,568
Patented Apr. 5, 1955

2,705,568

TOWEL BARS

Thelma G. Stewart, Tulsa, Okla.

Application August 14, 1951, Serial No. 241,785

3 Claims. (Cl. 211—123)

The present invention relates to a towel bar or rack and it consists in the combinations, constructions and arrangements of parts herein described and claimed.

Generally there is provided a composite towel bar or rack which consists of a wall bracket having integrally formed therewith an outwardly extending male connector member or arm to which may be removably connected a female connector member of an intermediate towel support having one or more towel supporting arms extending therefrom and having forwardly projecting therefrom a male connector member. There is also provided an outer towel support having one or more arms thus extending therefrom and provided upon its inner side with a female connector member. The device is such that the outer member may be connected to the bracket or, where desired, one or more intermediate members may be connected to the bracket and the outer member then connected to the outermost of the intermediate members. There is also provided a modified form of bracket and a modified form of female connector member, all of such connector members being of the interlocking type.

It is accordingly an object of the invention to provide a towel bar which may be utilized in a variety of places and which may be expanded, as desired.

Another object of the invention is to provide a novel pair of connector members forming a part of the invention.

A further object of the invention is to provide a device of the character set forth which is simple in construction, inexpensive to manufacture and yet effective and efficient in use.

Other and further objects of the invention will become apparent from a reading of the following specification taken in conjunction with the drawing, in which:

Figure 1 is a perspective view of an embodiment of the invention,

Figure 2 is a sectional view taken along line 2—2 of Figure 1,

Figure 5:
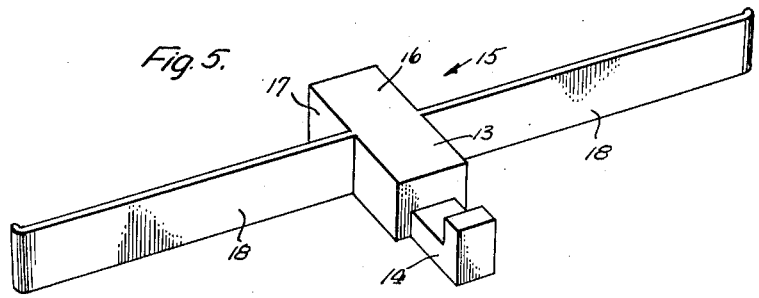
Figure 6:
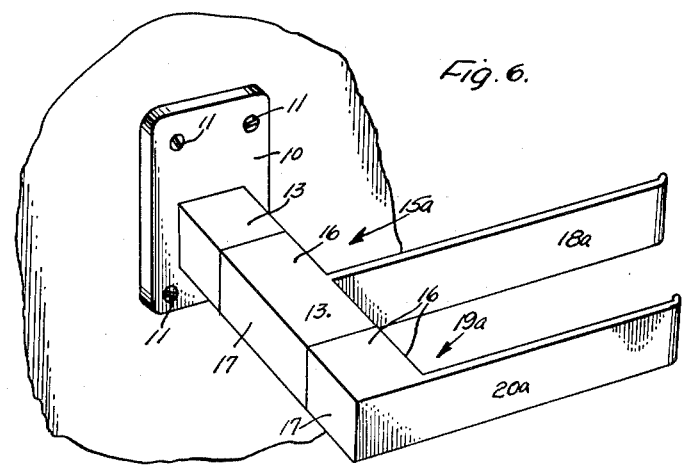
Figure 7:
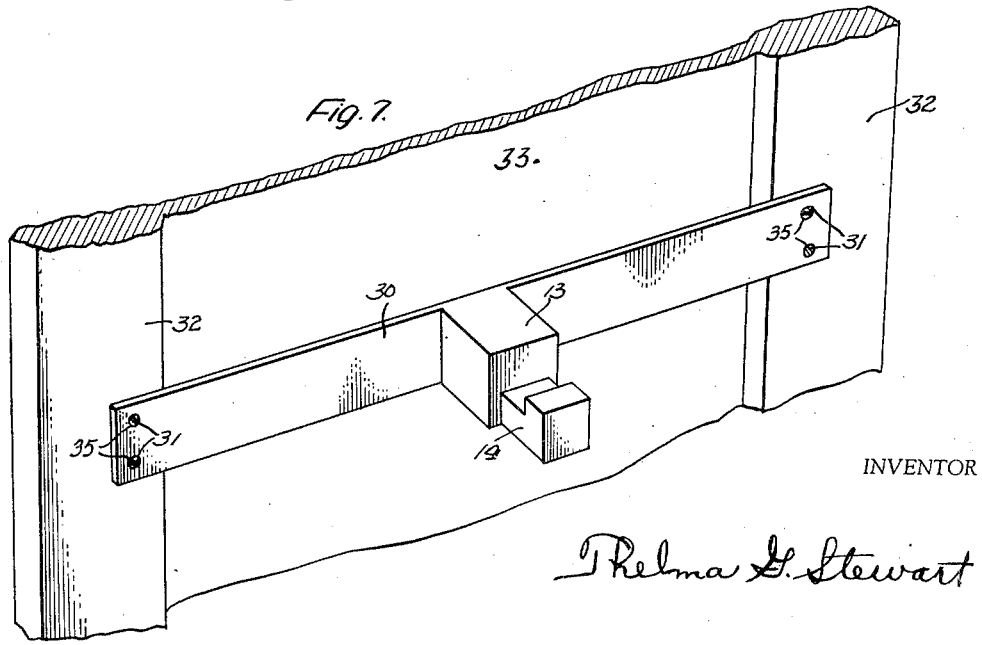

Figure 3 is a perspective view of a bracket and its attached male connector member forming a part of the invention, Figure 4 is a fragmentary perspective view of the underside of a female connector member forming a part of the invention, Figure 5 is a perspective view of an intermediate support shown also in Figure 1 and forming a part of the invention, Figure 6 is a perspective view of a modified form the invention may assume, and Figure 7 is a perspective view of still another modified form of the invention.

Referring more particularly to the drawing, there is shown therein a substantially rectangular vertically extending bracket 10 having openings therethrough for the reception of screws 11 whereby the same may be attached to, for example, a door or wall 12. Integrally formed with the lower portion of the bracket 10 and extending horizontally outwardly therefrom is a male connector member or arm 13 whose outer end is reduced in size and formed into an upwardly extending hook 14.

An intermediate member is generally indicated at 15 and consists of a female connector member having a downwardly directed end wall stub portion 16 and a pair of integrally formed side wall members 17 providing a socket 34 to receive hook 14. A pair of laterally extending horizontal towel supports 18 are formed integrally with the supporting member 15 the inner end of which is provided with the socket 34 and the forward side of the towel support has centrally formed thereon a male connector or arm 13 having an upwardly extending hook 14 which parts are identical with those described with regard to the bracket 10.

An outer support member is generally indicated at 19 and consists of a female connector member having a downwardly directed end wall stub portion 16 and a pair of side walls 17 providing a socket 34 which are identical with those heretofore described with the intermediate member 15. The outer member 19 is provided with a single towel support 20 which extends laterally and horizontally in both directions from the outer end of the support member 19, as shown clearly in Figure 1.

In the form of the invention illustrated in Figure 6 of the drawings, there is provided an intermediate member 15a which is identical in construction with the intermediate member 15 with the exception that only one laterally extending towel support 18a is included as a part of the structure. Likewise in Figure 6 of the drawings there is provided an outer member 19a which is identical in construction with the outer member 19 likewise with the exception that the towel support 20a extends only in one direction instead of two.

In Figure 7 there is shown the modified form of bracket in which an elongated bracket 30 is provided with openings 35 at either end through which screws 31 may be extended to attach the same to the thickened outer portions 32 of a door whose central portion is in the form of a relatively thin panel 33. There is centrally mounted upon the outer side of the bracket 30 a male connector member or arm 13 provided with the upturned hook portion 14 similar to those heretofore described.

In operation, it will be apparent that whether the bracket 10 or the bracket 30 is used, an outer member 19 may be immediately connected therewith by inserting the end wall stub portion 16 of the socket 34 downwardly upon the hook 14 to interlock the same and thus present a single towel rack extending in both directions from the connector members and which towel rack will have a smooth appearance upon its outer side as clearly shown in Figure 1. If, however, it is desired to provide additional towel racks, an intermediate member 15 may be interlocked with the member or arm 13 and thereafter additional intermediate members may be connected successively to the number desired and an outer member 19 connected at the outermost end of the series. In other cases, where it is desirable to have the towel supporting arms extending in one direction only, as, for example, in Figure 6, to either the brackets 10 or 30 there may be connected either the outer member 19a alone or with one or more intermediate members 15a connected between the outer member 20a and its bracket.

While only certain forms of the invention have been shown and described herein, it will be readily apparent to those skilled in the art that many minor modifications may be made without departing from the spirit of the invention or the scope of the appended claims.

What is claimed is:

1. A device of the character described comprising a bracket having an outwardly extending arm, an upwardly extending hook formed integrally with the outer end of said arm, an intermediate support member having a socket formed in the underside thereof adjacent its inner end and an upwardly extending hook formed integrally with the outer end thereof, an outer support member having a socket formed in its underside adjacent its rear end, said hooks being snugly receivable in adjacent sockets, and a pair of laterally extending support bars affixed to each of said support members.

2. A device of the character described comprising a bracket member, a plurality of outwardly extending supporting members positioned in abutting end-to-end relation to provide an aligned outwardly extending group of said supporting members the end of each of said supporting members of said group nearest said bracket having a socket formed in the underside thereof, an upwardly extending hook member integral with said bracket member, said bracket hook member being snugly receivable in the socket provided in the end of an end supporting member of said group, a plurality of upwardly extending hook members, each of said last named hook members being integral with one of the said supporting members and formed on the end thereof remote from said bracket, each of said last named hook members being snugly receivable in the socket provided in the abutting end of the adjacent supporting member, and at least one laterally extending support bar being affixed to each of said supporting members.

3. A device of the character described comprising a bracket member, an upwardly extending hook member consisting of an outwardly extending portion and an upwardly extending portion, said hook member being secured to said bracket member, said outwardly extending portion having a broad horizontally disposed supporting surface on the uppermost face thereof, said upwardly extending portion and said bracket each having vertically disposed opposing surfaces, an outwardly extending supporting member having one end positioned adjacent said bracket, said end of said supporting member having a top wall, a depending stub end wall and a pair of spaced side walls to provide a recess, said stub end wall having a broad horizontally disposed surface on the lowermost face thereof co-extensive with and engaged with said horizontally disposed supporting surface of said hook member, an external vertically disposed surface engaging said vertically disposed bracket surface, and an internal vertically disposed surface coextensive with and engaged with the vertically disposed surface on said upwardly extending portion of said hook, said spaced side walls extending entirely over and engaging the sides of said hook member, said recessed end of said outwardly extending supporting member being thus adapted to receive and completely conceal said hook member, and at least one laterally extending supporting bar integrally secured to said outwardly extending supporting member.

References Cited in the file of this patent

UNITED STATES PATENTS

| | | |
|---|---|---|
| D. 118,111 | Daniels | Dec. 19, 1939 |
| 562,257 | Spencer | June 16, 1896 |
| 896,182 | Villard | Aug. 18, 1908 |
| 986,788 | Wilson | Mar. 14, 1911 |
| 1,444,611 | Johannson | Feb. 6, 1923 |
| 1,500,569 | Barnhill | July 8, 1924 |
| 1,914,974 | McGrail | June 20, 1933 |
| 2,149,016 | Godfrey | Feb. 28, 1939 |
| 2,252,249 | Brown | Aug. 12, 1941 |